US005898103A

United States Patent [19]

Denz et al.

[11] Patent Number: 5,898,103

[45] Date of Patent: Apr. 27, 1999

[54] ARRANGEMENT AND METHOD FOR CHECKING THE TIGHTNESS OF A VESSEL

[75] Inventors: Helmut Denz, Stuttgart; Andreas Blumenstooh, Ludwigsburg; George Mallebrein, Singen; Uwe Konzelmann, Asperg, all of Germany

[73] Assignee: Robert Bosch GmbH, Stuttgart, Germany

[21] Appl. No.: 08/877,799

[22] Filed: Jun. 18, 1997

[30] Foreign Application Priority Data

Jun. 27, 1996 [DE] Germany .......................... 196 25 702

[51] Int. Cl.[6] .................................................... G01M 3/04

[52] U.S. Cl. .............................. 73/49.2; 73/40; 73/118.1; 123/518

[58] Field of Search .......................... 73/40, 49.2, 118.1, 73/744, 861.53, 861.54, 861.55, 861.57, 861.58; 123/516, 518, 679, 520; 200/82 R

[56] References Cited

U.S. PATENT DOCUMENTS

| | | | |
|---|---|---|---|
| 638,052 | 11/1899 | Heintz | 73/744 |
| 1,107,298 | 8/1914 | Haas | 73/744 |
| 1,594,808 | 8/1926 | Anderson | 73/744 |
| 2,064,179 | 12/1936 | Ragsdale | 200/82 R |
| 2,574,866 | 11/1951 | Fahrlander | 73/861.58 |
| 3,463,554 | 8/1969 | Beuler | 200/82 R |
| 3,528,288 | 9/1970 | Scourtes | 73/861.58 |
| 3,822,370 | 7/1974 | Olsen et al. | 200/82 R |
| 4,184,674 | 1/1980 | Wirz et al. | 200/82 R |
| 5,065,350 | 11/1991 | Fedder | 73/40 |
| 5,111,900 | 5/1992 | Leitermann | 123/519 |
| 5,122,628 | 6/1992 | McLelland et al. | 200/82 R |
| 5,146,902 | 9/1992 | Cook et al. | 123/518 |
| 5,183,023 | 2/1993 | Hanson | 123/520 |
| 5,297,529 | 3/1994 | Cook et al. | 123/520 |
| 5,390,645 | 2/1995 | Cook et al. | 123/520 |
| 5,483,942 | 1/1996 | Perry et al. | 123/520 |
| 5,511,529 | 4/1996 | Blumenstock et al. | 123/520 |
| 5,601,065 | 2/1997 | Tamura et al. | 123/516 |

*Primary Examiner*—George Dombroske
*Assistant Examiner*—Paul D. Amrozowicz
*Attorney, Agent, or Firm*—Walter Ottesen

[57] ABSTRACT

The invention is directed to an arrangement for checking the tightness of a vessel such as a tank system of a motor vehicle. The vessel can have a possible leak and this can be viewed as a first flow resistor. The arrangement includes a pressure source for generating a pressure change in the vessel and a pressure divider system is connected between the pressure source and the vessel which is subjected to the pressure change. The pressure divider system is defined by and includes the first flow resistor and a reference branch having a predetermined second flow resistor. A pressure sensor measures the pressure relationships in the pressure divider system. The invention provides a reliable statement as to a possible leak in the tank system of a motor vehicle while providing a simple and therefore cost effective manufacture. The pressure source used to check the tightness can be utilized for other tasks required in a motor vehicle. The invention also relates to a method for checking the tightness of the vessel.

8 Claims, 1 Drawing Sheet

ARRANGEMENT AND METHOD FOR CHECKING THE TIGHTNESS OF A VESSEL

FIELD OF THE INVENTION

The invention relates to an arrangement for checking the tightness of a vessel and especially a motor vehicle tank system. The arrangement includes at least one pressure source via which a pressure increase in the vessel can be generated. The arrangement further includes a reference measuring device which can be charged with pressure via a pump and which includes at least one flow resistor of a specific flow resistance in at least one reference flow branch. When a leak is present, the reference measuring device detects a quantity of the vessel and compares this quantity to a corresponding quantity of the reference measuring device in order to determine the presence of a leak.

BACKGROUND OF THE INVENTION

The California Environmental Authority (CARB) as well as United States federal authorities require an onboard diagnosis of the tank system in motor vehicles. Here, leaks of a specific size (for example, leaks greater than 1 mm in diameter) are to be detected.

U.S. Pat. No. 5,390,645 discloses an arrangement for checking the tightness of a motor vehicle tank system wherein the tightness check is performed with the aid of a pump volume flow divided into two paths. A first path is connected to the motor vehicle tank system; whereas, the second path is connected to the atmosphere via a reference leak in the form of a flow resistor of a specific size.

A flow sensor is installed in each of the paths and detects the flow along the corresponding path. A conclusion is drawn in an electronic circuit device as to the presence of a leak or the non-presence thereof based on a flow difference in the two paths.

Disadvantages are present with respect to this arrangement. On the one hand, two separate comparatively complex flow sensors are required in addition to the electronic circuit arrangement. Furthermore, the pump in this arrangement is only used for diagnostic purposes. However, a diagnosis is performed only rarely (approximately 1% of the entire driving operation). For this reason, the pump therefore has a disadvantageously low degree of use.

SUMMARY OF THE INVENTION

In view of the above, it is an object of the invention to provide an arrangement for checking the tightness of a vessel and especially for detecting the tightness of a motor vehicle tank system which is so improved that a reliable statement as to a possible leak present in the tank system is obtained in a manner as simple as possible and therefore provide a system which can be manufactured at favorable cost. The pressure source used to make the tightness check can also be used for other tasks required in a motor vehicle.

The arrangement of the invention is for checking the tightness of a vessel, such as a tank system of a motor vehicle. The vessel can have a possible leak defining a first flow resistor. The arrangement includes: pressure source means for generating a pressure change in the vessel; a pressure divider system connected between the pressure source means and the vessel and being subjected to the pressure change; the pressure divider system being defined by and including the first flow resistor and a reference branch having a predetermined second flow resistor; and, pressure measuring means for measuring the pressure relationships in the pressure divider system.

In the above, at least one of the flow resistors is arranged as a pressure divider arrangement having a pressure ratio detected by a pressure measuring device. This configuration affords the significant advantage that only a single measuring device is needed in order to make a reliable statement as to a leak possibly present in a motor vehicle tank system. The single measuring device is a simple pressure measuring device which can be provided at favorable cost.

In principle, a single flow resistor and a pressure sensor are adequate for detecting a leak in the motor vehicle tank system.

An especially advantageous embodiment provides that the pressure-divider arrangement is a pressure-divider bridge having a branch comprising two flow resistors which are mounted between the pressure source and the atmosphere. The other branch of the arrangement includes the vessel and a further flow resistor mounted between the vessel and the pressure source. The pressure measuring device is a difference pressure sensor mounted in the bridge diagonal.

The configuration of the pressure-divider arrangement as a pressure-divider bridge having a difference-pressure sensor mounted in the bridge diagonal affords the significant advantage that the arrangement is balanced when there is a leak to be detected and, in this way, is at this operating point independent of tolerances of the pressure source. Furthermore, the vaporization of fuel in the fuel tank system can be determined via such a pressure-divider bridge in a manner explained hereinafter.

Furthermore, the arrangement of the invention is also independent of the ambient pressure because of the pressure difference measurement.

Preferably, the flow resistors are so dimensioned that they have the same flow resistance as the flow resistance of the smallest leak to be diagnosed.

A further advantageous embodiment provides that the reference pressure sensor has a cross section dependent upon the difference pressure.

Especially with respect to the use of the pressure source for further purposes specific to the vehicle, it is advantageously provided that a bypass channel is in parallel with the reference measuring device. This bypass channel can be closed via a controllable bypass valve.

In this way, the pressure source can also be used to regenerate an active-charcoal filter mounted in the venting line of the tank system of the motor vehicle. Statutory environmental requirements provide for a maximum vapor emission of hydrocarbon substances of a motor vehicle. For this reason, tank-venting systems are installed in motor vehicles in order to limit the emission of hydrocarbon substances from the tank. An active-charcoal filter is mounted in the venting line of the motor vehicle tank system and the hydrocarbon substances given off by the fuel in the tank deposit on the active charcoal. The regeneration of the active-charcoal filter takes place in a manner known per se by opening a tank-venting valve whereby ambient air is inducted through the active-charcoal filter because of the underpressure present in the intake pipe so that the hydrocarbon substances deposited in the filter are dislodged and are conducted to the engine for combustion in the cylinder.

A regeneration of this kind is problematical especially for an engine which does not have a throttle flap because an underpressure is no longer present in the intake pipe. Furthermore, a regeneration of the active-charcoal filter is problematical also for engines having a throttle at high load (because at high load, the throttle flap is open and there is high pressure on both sides thereof) or during a charging operation (that is, the engine has a turbocharger or a compressor or the like). During this charging operation, the turbocharger, for example, blows air into the intake pipe so that the pressure increases and the engine does not generate an underpressure which will enable regeneration of the active charcoal filter via the tank-venting valve.

The bypass channel is arranged parallel to the reference device and can be opened and closed via a controllable bypass valve. This bypass valve makes possible a simultaneous use of the pressure source for regeneration of the active-charcoal filter of a motor vehicle tank system especially for an engine without a throttle flap or during high-load operation even for conventional engines. In this way, the pressure source, which operates to check tightness, can be advantageously utilized also for regenerating the tank-venting system.

The difference pressure sensor of the invention is for measuring the difference pressure between the two ends of a flow channel. The difference pressure sensor includes: two springs mounted in the flow channel so as to develop spring return forces in mutually opposite directions; a seal ring mounted in the flow channel and defining a cross section; a flow body arranged in the seal ring so as to cooperate therewith to close off said flow channel; and, the flow body being disposed between the springs so as to be displaceable from an initial position within the seal ring against the return force of either of the springs in dependence upon the difference pressure thereby opening the cross section defined by the seal ring.

A difference pressure sensor of the type described above can be used especially advantageously in the above-described arrangement to check the tightness of the tank. This is so because no difference pressure is present when there is a leak so that the switch is closed and a leak is indicated.

The method of the invention is for checking the tightness of a vessel of a fuel tank system of a motor vehicle. The vessel can have a possible leak defining a first flow resistor. The method includes: providing a pressure source for generating a pressure change in the fuel tank; providing a reference branch including at least a second flow resistor; connecting the first flow resistor and the second flow resistor to define a pressure divider system connected to the pressure source; and, measuring the pressure relationships in the pressure divider system and applying the same as a measure for the leak of the vessel.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
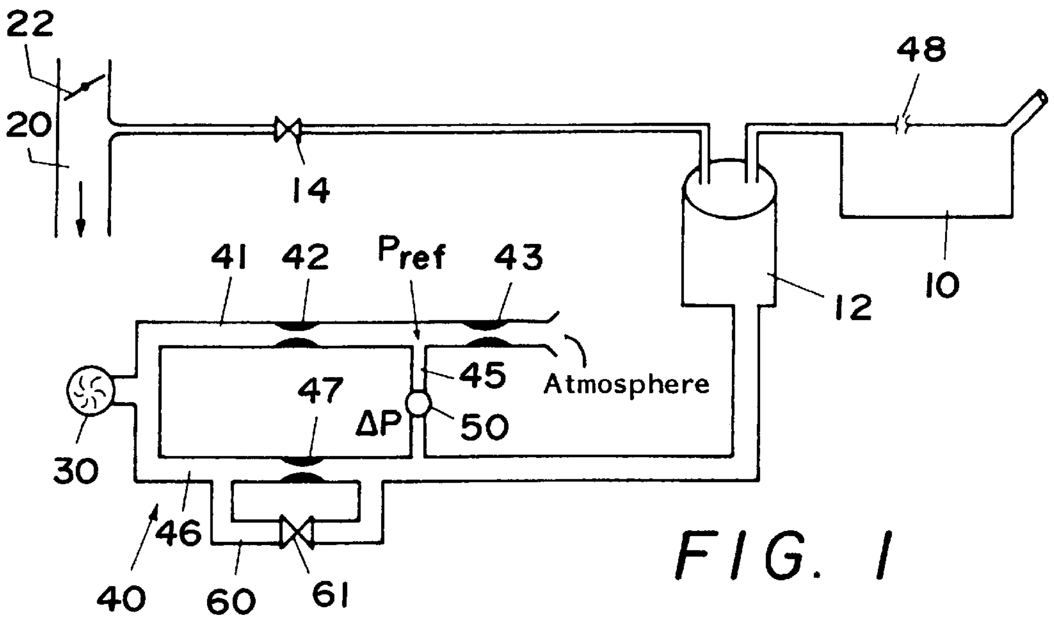
FIG. 1 is a schematic of an arrangement according to the invention for checking the tightness of a tank system of a motor vehicle.

Referring to FIG. 1, a tank system of a motor vehicle includes a tank 10 which is connected via an active-charcoal filter 12 and a tank-venting valve 14 to an intake pipe 20 of an internal combustion engine (not shown). A throttle flap 22 is mounted in the intake pipe 20.

Hydrocarbon substances develop in the tank 10 because of vaporization and accumulate in the active-charcoal filter 12. The tank-venting valve 14 is opened to regenerate the active-charcoal filter 12. When valve 14 is opened, air of the atmosphere is inducted through the active-charcoal filter 12. This air is inducted because of the underpressure present in the intake pipe 20. In this way, the hydrocarbon substances, which have accumulated in the active-charcoal filter 12, are drawn by suction into the intake pipe 20 and are supplied to the engine.

A pump 30 is provided to check the tightness of the tank system of the motor vehicle. The pump 30 is connected via a pressure-divider bridge 40 to the tank system of the motor vehicle.

The pressure-divider bridge 40 includes a bridge branch 41 in which two flow resistors (42, 43) are mounted between the pump 30 and the atmosphere. The other bridge branch 46 includes an additional flow resistor 47, which is connected via the active-charcoal filter 12 to the tank 10, as well as the flow resistance of a leak 48. The flow resistors 42, 43 and 47 are so dimensioned that they have the same flow resistance as the flow resistance of the smallest leak 48 to be diagnosed.

A difference-pressure sensor 50 is mounted in the bridge diagonal 45.

To diagnose the leak, a pressure is generated with the pump 30 in the entire tank system of the motor vehicle. If no leak is present, then a difference pressure $\Delta p \neq 0$ occurs at the difference-pressure sensor 50 and this signalizes the non-presence of a leak. If, in contrast, the leak 48 is present and it has a size which corresponds to the flow resistors 42, 43, 47, then the pressure-divider bridge is balanced and $\Delta p \geqq 0$ is detected by the difference-pressure sensor 50 and, in this way, the presence of a leak is signaled.

As shown in FIG. 1, a bypass channel 60 is arranged parallel to the entire reference-measuring device in the form of the pressure-divider bridge 40. The bypass channel 60 can be closed via a controllable bypass valve 61. For an open bypass valve 61, a pressure increase can be introduced into the tank system without passing the flow resistor 47 whereby the above-described regeneration of the active-charcoal filter 12 is possible in an especially simple manner. This can take place, for example, for an engine without a throttle flap 22 or in the overload range of a throttled engine or for a conventionally throttled engine with the tank-venting valve 14 opened and with the bypass valve 61 opened.

To obtain an especially precise detection of a possibly present leak, the difference pressure is first detected and is considered as an offset for later leak diagnosis. This difference pressure is detected when the tank-venting valve 14 is closed and the pump 30 is switched off and after a cold start when no vaporization can be determined from the tank 10 and when the bypass valve 61 is open. With this calibration, leaks of a pregiven size can be very precisely detected even for low difference-pressure sensor offsets.

With the arrangement of the invention, an estimate of the vaporization of the fuel present in the fuel tank 10 is possible. With the tank-venting valve 14 closed and with the bypass valve 61 closed as well as with a switched off pump, the pressure in the tank system of the motor vehicle can be measured by means of the difference-pressure sensor 50. This pressure is a measure for the vaporization of the fuel in the tank 10 since the difference-pressure sensor 50 to a certain extent measures the pressure in the tank 10 compared to the ambient pressure in the bridge branch functioning as a reference branch. The tank 10 is essentially tightly closed except for the flow resistor 47.

Furthermore, and for vaporization of the fuel, a check can be made in this way as to whether the tank-venting valve 14 or the bypass valve 61 can still be opened. The pressure difference must drop when driving the particular valve. If this is not the case, then the conclusion can be drawn that there is a blockage or a non-functioning tank-venting valve or non-functioning bypass valve 61.

Figure 2:
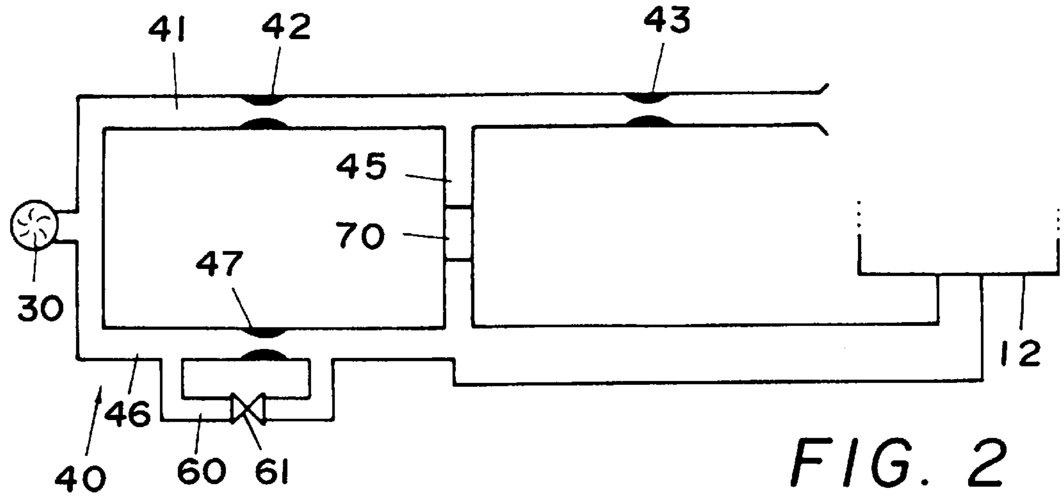
FIG. 2 is another embodiment of an arrangement for checking the tightness of a tank system of a motor vehicle; and, FIG. 3 shows a difference-pressure sensor according to the invention which has a cross-sectional opening dependent upon difference pressure.

A further, simpler configuration to check tightness of the tank system of the motor vehicle is shown in FIG. 2.

The pressure-divider bridge 40 shown in FIG. 2 distinguishes with respect to its arrangement and configuration from that shown in FIG. 1 only in that a difference-pressure measuring device having an opening cross section 70 dependent upon difference pressure is provided in lieu of a conventional difference-pressure measuring apparatus.

Figure 3:
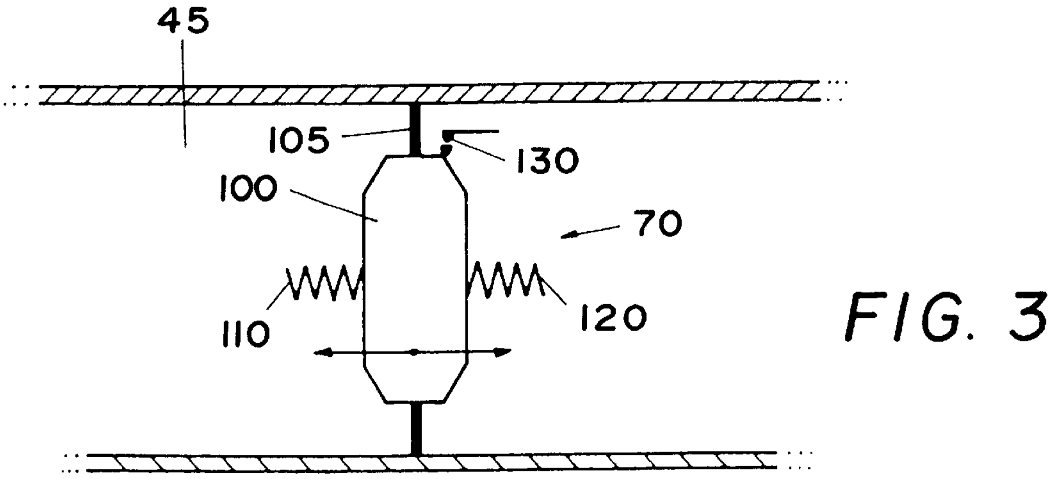

A difference-pressure measuring arrangement of the above kind is shown in FIG. 3 and includes a flow body 100 which essentially tightly closes the cross section of a flow channel (in this case, the bridge diagonal 45) fixed by a sealing ring 105. The flow body 100 is mounted so as to be moveable against the return force of two return springs (110, 120) which operate in mutually opposing directions to each other and closes a position switch 130 in its initial position.

The position switch 130 is closed when the same pressure is present in channel 45 at both sides of the flow body 100 so that no difference pressure is present. This is the case when a leak is present in the arrangement shown in FIG. 2. With the position switch 130 closed, the presence of a leak is signaled, for example, for the arrangement shown in FIG. 2.

If pressures at both sides of the flow body 100 are different, then the flow body 100 is displaced to the side of the channel 45 at which the lower pressure is present. Above a certain pressure, and because of the shape of the flow body 100, a gap between the seal ring 105 and the flow body 100 is opened. The shape of the flow body tapers toward the seal ring 105. The gap continues to become greater because of a further displacement of the flow body 100 with increasing pressure until the opening, which is defined by the seal ring 105, is entirely clear.

It is understood that the foregoing description is that of the preferred embodiments of the invention and that various changes and modifications may be made thereto without departing from the spirit and scope of the invention as defined in the appended claims.

What is claimed is:

1. An arrangement for checking the tightness of a vessel such as a tank system of a motor vehicle, the vessel having a possible leak defining a first flow resistor, and the arrangement comprising:

pressure source means for generating a pressure change in said vessel;

a pressure divider system connected between said pressure source means and said vessel and being subjected to said pressure change;

said pressure divider system being defined by and including said first flow resistor and a reference branch having a predetermined second flow resistor; and, a difference pressure sensor for measuring a pressure difference in said pressure divider system.

2. An arrangement for checking the tightness of a vessel such as a tank system of a motor vehicle, the vessel having a possible leak defining a first flow resistor, and the arrangement comprising:

pressure source means for generating a change in pressure in said vessel;

a pressure divider bridge including: one branch including said first flow resistor and a second flow resistor connected between said first flow resistor and said pressure source means; an other branch including third and fourth flow resistors connected between said pressure source means and the atmosphere; and, a bridge diagonal connected between said one branch and said other branch; and, a difference pressure sensor connected into said bridge diagonal to measure the pressure difference between said branches which defines a measure of a leak in said vessel.

3. The arrangement of claim 2, further comprising a bypass channel connected in parallel to said pressure divider system; and, a bypass valve mounted in said bypass channel and being operable to close and open said bypass channel to increase or reduce the flow resistance in one of the branches of said pressure divider system.

4. The arrangement of claim 2, further comprising:

a flow channel connected between said one branch and said other branch to define said bridge diagonal;

said difference pressure sensor being provided for measuring the difference pressure between said one branch and said other branch;

said difference pressure sensor including:

two springs mounted in said flow channel so as to develop spring return forces in mutually opposite directions;

a seal ring mounted in said flow channel and defining a cross section;

a flow body arranged in said seal ring so as to cooperate therewith to close off said flow channel; and, said flow body being disposed between said springs so as to be displaceable from an initial position within said seal ring against the return force of either of said springs in dependence upon said difference pressure thereby opening said cross section defined by said seal ring.

5. The arrangement of claim 4, further comprising a position switch which closes when said flow body is in said initial position.

6. An arrangement for checking the tightness of a vessel such as a tank system of a motor vehicle, the vessel having a possible leak defining a first flow resistor, and the arrangement comprising:

pressure source means for generating a change in pressure in said vessel;

a pressure divider bridge including: one branch including said first flow resistor and a second flow resistor connected between said first flow resistor and said pressure source means; an other branch including third and fourth flow resistors connected between said pressure source means and the atmosphere, and, a bridge diagonal connected between said one branch and said other branch;

a difference pressure sensor connected into said bridge diagonal to measure the pressure difference between said branches which defines a measure of a leak in said vessel; and, said second, third and fourth flow resistors each being dimensioned so that they have the same flow resistance as said first flow resistor with said first flow resistor defining the smallest leak in said vessel which is to be diagnosed.

7. The arrangement of claim 6, said difference pressure sensor defining a cross section dependent upon said pressure difference.

8. A method for checking the tightness of a vessel of a fuel tank system of a motor vehicle, the vessel having a possible leak defining a first flow resistor, and the method comprising:

providing a pressure source for generating a pressure change in said fuel tank;

providing a reference branch including at least a second flow resistor;

connecting said first flow resistor and said second flow resistor to define a pressure divider system connected to said pressure source; and, measuring a pressure difference in said pressure divider system utilizing a difference pressure sensor and applying the same as a measure for said leak of said vessel.

* * * * *